US008000007B2

(12) United States Patent
Plant

(10) Patent No.: US 8,000,007 B2
(45) Date of Patent: Aug. 16, 2011

(54) POLARIZATION FILTER UTILIZING BREWSTER'S ANGLE

(76) Inventor: James Plant, Victoria (CA)

( * ) Notice: Subject to any disclaimer, the term of this patent is extended or adjusted under 35 U.S.C. 154(b) by 0 days.

(21) Appl. No.: 12/581,411

(22) Filed: Oct. 19, 2009

(65) Prior Publication Data

US 2010/0033815 A1   Feb. 11, 2010

Related U.S. Application Data

(62) Division of application No. 11/347,011, filed on Feb. 3, 2006, now Pat. No. 7,619,817.

(30) Foreign Application Priority Data

Feb. 4, 2005  (CA) ..................... 2496235

(51) Int. Cl.
G02B 5/30 (2006.01)
G02B 27/28 (2006.01)
G02B 6/04 (2006.01)

(52) U.S. Cl. ............... 359/485.02; 359/833; 385/11; 385/39; 385/115

(58) Field of Classification Search ........... 359/487, 359/495, 833, 837, 485.02; 385/11, 39, 115
See application file for complete search history.

(56) References Cited

U.S. PATENT DOCUMENTS

| 3,310,358 A | 3/1967 | Marcatili |
| 3,349,238 A | 10/1967 | Kruger |
| 3,439,968 A | 4/1969 | Hansen et al. |
| 3,442,571 A | 5/1969 | Itzkan |
| 3,876,285 A | 4/1975 | Schwarzmuller |
| 3,979,924 A | 9/1976 | Pereda |
| 3,998,524 A | 12/1976 | Hubby, Jr. et al. |
| 4,017,153 A | 4/1977 | Sardos |
| 4,294,509 A | 10/1981 | Nagao |
| 4,525,034 A | 6/1985 | Simmons |
| 4,571,030 A | 2/1986 | Fountain |
| 4,606,605 A | 8/1986 | Ashkin et al. |
| 4,622,524 A | 11/1986 | Morz |
| 4,755,027 A | 7/1988 | Schafer |
| 4,929,067 A | 5/1990 | Sander |
| 5,024,850 A | 6/1991 | Broer et al. |
| 5,038,041 A | 8/1991 | Egan |
| 5,359,622 A | 10/1994 | Shih |
| 5,572,362 A | 11/1996 | Shikama et al. |
| 5,689,359 A | 11/1997 | Kurata et al. |
| 6,160,943 A | 12/2000 | Davis et al. |
| 6,172,824 B1 | 1/2001 | Lehmann et al. |
| 6,177,995 B1 | 1/2001 | Compain et al. |
| 6,456,434 B1 | 9/2002 | Davydov |

(Continued)

OTHER PUBLICATIONS

Demos, S.G., H. B. Radousky and R.R. Alfano, "Deep subsurface Imaging in Tissues using Spectral and Polarization Filtering", Optics Express, 7, 2000, pp. 23-28.

(Continued)

Primary Examiner — Ricky D Shafer
(74) Attorney, Agent, or Firm — Davis & Bujold, P.L.L.C.

(57) ABSTRACT

A polarization filter utilizing Brewster's angle. The polarization filter includes a stimulus receiving body having more than one facet. At least two of the more than one facet being arranged at Brewster's angle (relative to the plane of polarization of the incident stimulus) and positioned in different radial orientations (relative to the incident stimulus) which are adapted to provide differential transmission or reflection of polarized electro-magnetic radiation coming from a common source.

8 Claims, 19 Drawing Sheets

U.S. PATENT DOCUMENTS

| | | |
|---|---|---|
| 6,567,216 B2 | 5/2003 | Suzuki et al. |
| 6,661,952 B2 | 12/2003 | Simpson et al. |
| 6,667,786 B2 | 12/2003 | Van de Ven et al. |
| 6,690,514 B2 | 2/2004 | Davydov |
| 6,768,395 B1 | 7/2004 | Speldrich et al. |
| 6,980,358 B2 | 12/2005 | Thonn et al. |
| 7,619,817 B2 * | 11/2009 | Plant .............................. 359/487 |

OTHER PUBLICATIONS

Wolff, Lawrence B., "Applications of Polarization Camera Technology", IEE Expert, Oct. 1995.

* cited by examiner

POLARIZATION FILTER UTILIZING BREWSTER'S ANGLE

FIELD OF THE INVENTION

The present invention relates to a polarization filter, which may be used, to selectively transmit or reflect specific planes of polarize visible light, microwaves, radar waves, infrared waves or any selected wavelength within the electro-magnetic radiation spectrum.

BACKGROUND OF THE INVENTION

U.S. Pat. No. 3,998,524 (Hubby Jr. et al 1976) discusses four basic techniques for polarization: 1) Brewster's angle plates, 2) prisms, 3) dichroic materials, and 4) grids or gratings. A number of limitations relating to the use of Brewster's angle are identified. Hubby Jr. indicates that many surfaces must be cascaded in order to obtain a device with a useably high rejection of undesired polarization. This requirement for a multiplicity of surfaces is viewed by Hubby Jr. as increasing the size and cost of a device built upon the Brewster's angle principle.

SUMMARY OF THE INVENTION

According to the present invention there is provided a polarization filter utilizing Brewster's angle. The polarization filter includes a light receiving body having more than one facet. At least two of the more than one facet being cut at Brewster's angle (relative to the incident stimulus) and positioned in different radial orientations which are adapted to provide selective transmission or reflection of different polarization planes of electro-magnetic radiation coming from a common source.

The polarization filter described above facilitates determination of spatial variations within the polarization dimension of the incident stimulus. Polarization Difference Imaging (PDI) can then be applied to these polarization maps to enhance contrast and reduce noise due to scattering of the stimulus by intervening medium or mechanisms, thereby allowing for enhanced target detection and increased signal to noise ratios. While PDI imaging can be realized by utilizing and comparing only two orthogonal planes of polarization, it is preferred that at least three different polarization planes be utilized so that ambiguities in the spatial variations in polarization orientation and intensity can be avoided. It is also preferred that at least one adjacent facet with a surface perpendicular to the incident stimulus be provided as a comparative reference. Since all planes of polarization will be equally transmitted through this reference facet, the ratio of transmitted stimuli through adjacent facets cut at Brewster's angle (with differing radial orientation) can be used to compute the plane and percentage of polarization of the stimulus at that discrete spatial location.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
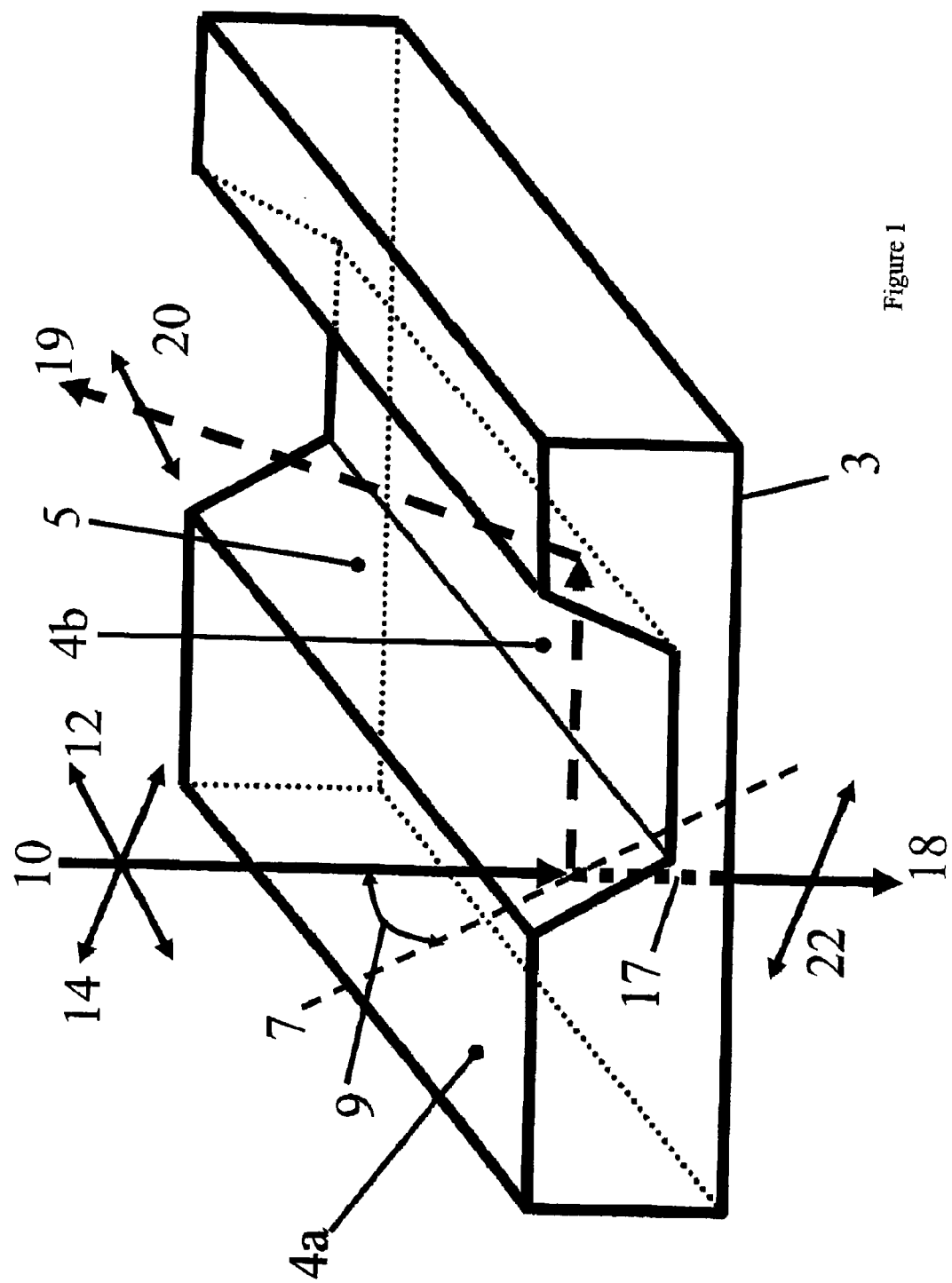
FIG. 1 is a perspective view of an optical component having a single groove or channel.

The preferred embodiment, a polarization filter utilizing Brewster's angle will now be described with reference to FIGS. 1 through 18.

Brewster's angle is the angle of incidence of electromagnetic radiation at which 100 percent of the radiation with a polarization parallel to the material's face is reflected. With transmissive materials, Brewster's angle is equal to the Arc Tangent of the material's refractive index for a given wavelength. Utilizing this proven optical principle, facets can be cut into transmissive material at Brewster's angle (relative to the incident stimulus), which will result in transmitted intensities through the material which will be dependent on (1) the actual stimulus intensity, (2) the percentage of the stimulus polarization, (3) the deviation of the incident radiation from Brewster's angle, and (4) the amount of deviation of the angle of polarization from being parallel to the reflecting surface (see FIG. 14. and FIG. 15.). For the purpose of this document, the optimum orientation of the face of the facet which results in the maximum reflection of a given polarized stimulus will be referred to as the "Brewster's Channel" for that stimulus.

It can be seen from the above principle of Brewster's angle that if one was to construct an array of multiple facets with faces cut at Brewster's angle, with each facet having differing radial orientations relative to the incident stimulus, these facets would allow for the transmission or reflectance of polarized stimuli proportional to its match to the specific characteristics of the Brewster's Channel it is incident upon. We have named such a grating of multiple Brewster's prisms (and reference channels) a Brewster's Grism.

According to the present invention there is provided a polarization filter utilizing Brewster's angle. The polarization filter includes a light receiving body (see FIG. 4, item 3.) having more than one facet. At least two of the more than one facet being cut at Brewster's angle (relative to the incident stimulus) and positioned in different radial orientations (see FIG. 1., item 5.) which are adapted to provide selective transmission or reflection of different polarization planes of electro-magnetic radiation coming from a common source.

The polarization filter described above facilitates determination of spatial variations within the polarization dimension of the incident stimulus. Polarization Difference Imaging (PDI) can then be applied to these polarization maps to enhance contrast and reduce noise due to scattering of the stimulus by intervening medium or mechanisms, thereby allowing for enhanced target detection and increased signal to noise ratios (L. B. Wolff, 1994). While PDI imaging can be realized by utilizing and comparing only two orthogonal planes of polarization, it is preferred that at least three different polarization planes be utilized so that ambiguities in the spatial variations in polarization orientation and intensity can be avoided (see FIG. 3.). It is also preferred that at least one adjacent facet with a surface perpendicular to the incident stimulus be provided as a comparative reference (see FIG. 2., items 4a and 4b, and FIG. 3., items 4a and 4b). Since all planes of polarization will be equally transmitted through this reference facet, the ratio of transmitted stimuli through adjacent facets cut at Brewster's angle (with differing radial orientation) can be used to compute the plane and percentage of polarization of the stimulus at that discrete spatial location.

FIG. 1.

This figure illustrates a flat portion (3) of optical material (such as quartz or fused silica), in which a groove has been formed, having a flat bottom (4b) and flat shoulders (4a). The sides of the groove are parallel to each other, and relative to a line drawn parallel to the facet's face (7), are inclined at an angle (9) which is (relative to the incident stimulus, 10), equal to the Arc Tangent of the material's refractive index for the stimuli's wavelength. Such an angle is known as Brewster's Angle, and it has the effect of completely reflecting polarized light (19), which has an orientation (12,20) that is parallel to the surface's face (5). Other orientations of polarization, such as vertical (14,22) are transmitted (17) through the optical component, and are emitted (18).

FIG. 2.

Figure 2:
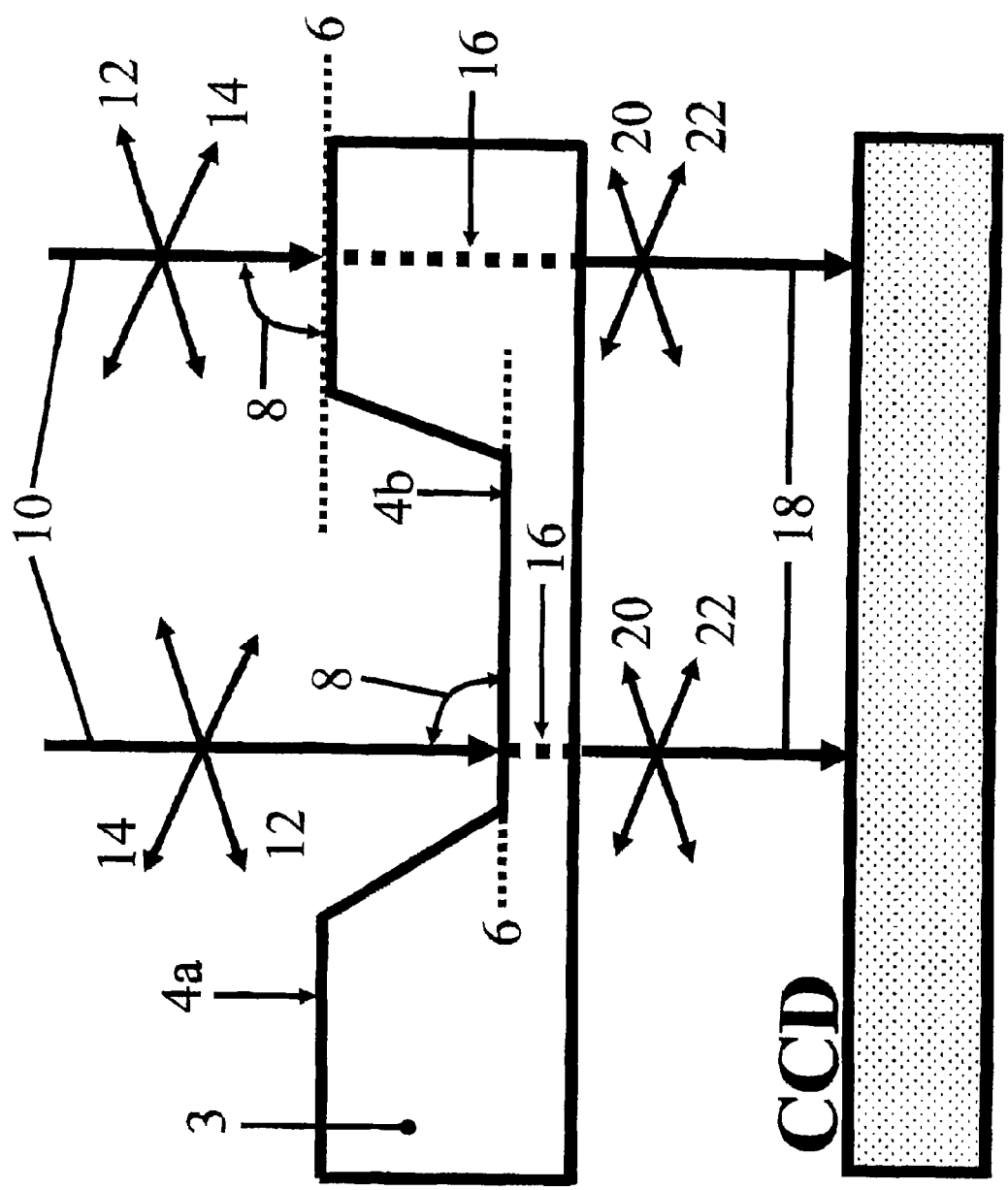
FIG. 2 is an end view of the optical component illustrated in FIG. 1.

This figure illustrates an end view of the portion of the optical component as presented in FIG. 1. If a line (6) is drawn parallel to the flat surfaces 4a or 4b, the resulting angle (8) between these lines and the incident stimuli (10) striking these surfaces is equal to 90 degrees. At this angle, the majority of the stimuli is transmitted through the optical material (16), and is emitted (18) with all polarization angles being transmitted (e.g. 20 and 22). The transmitted stimulus can then be recorded by an underlying sensor (FIG. 2., CCD).

FIG. 3.

This figure represents a plan view, illustrating an optical component (such as shown in FIG. 1. and FIG. 2.), created by intersecting three grooves (30,32,34), with a relative angular separation of 120 degrees. The resultant pattern of facets (36) is comprised of two basic shapes; large (38) and small (40) triangles. These triangles have both flat surfaces (4a, 4b, 4c) and a number of facets cut at Brewster's Angle (5) with differing radial orientations.

FIG. 4.

Figure 3:
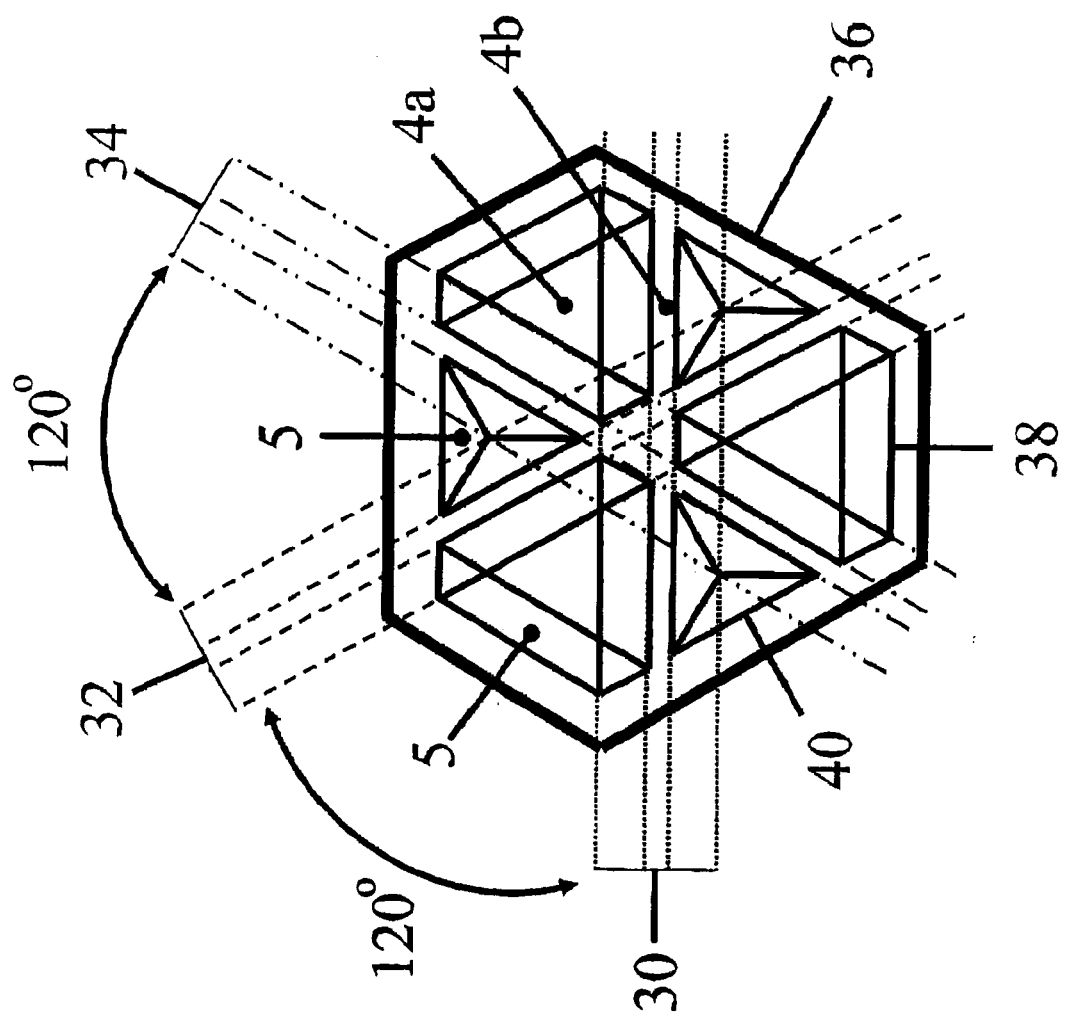
FIG. 3 is a top plan view of an optical component having several intersecting grooves.
Figure 4:
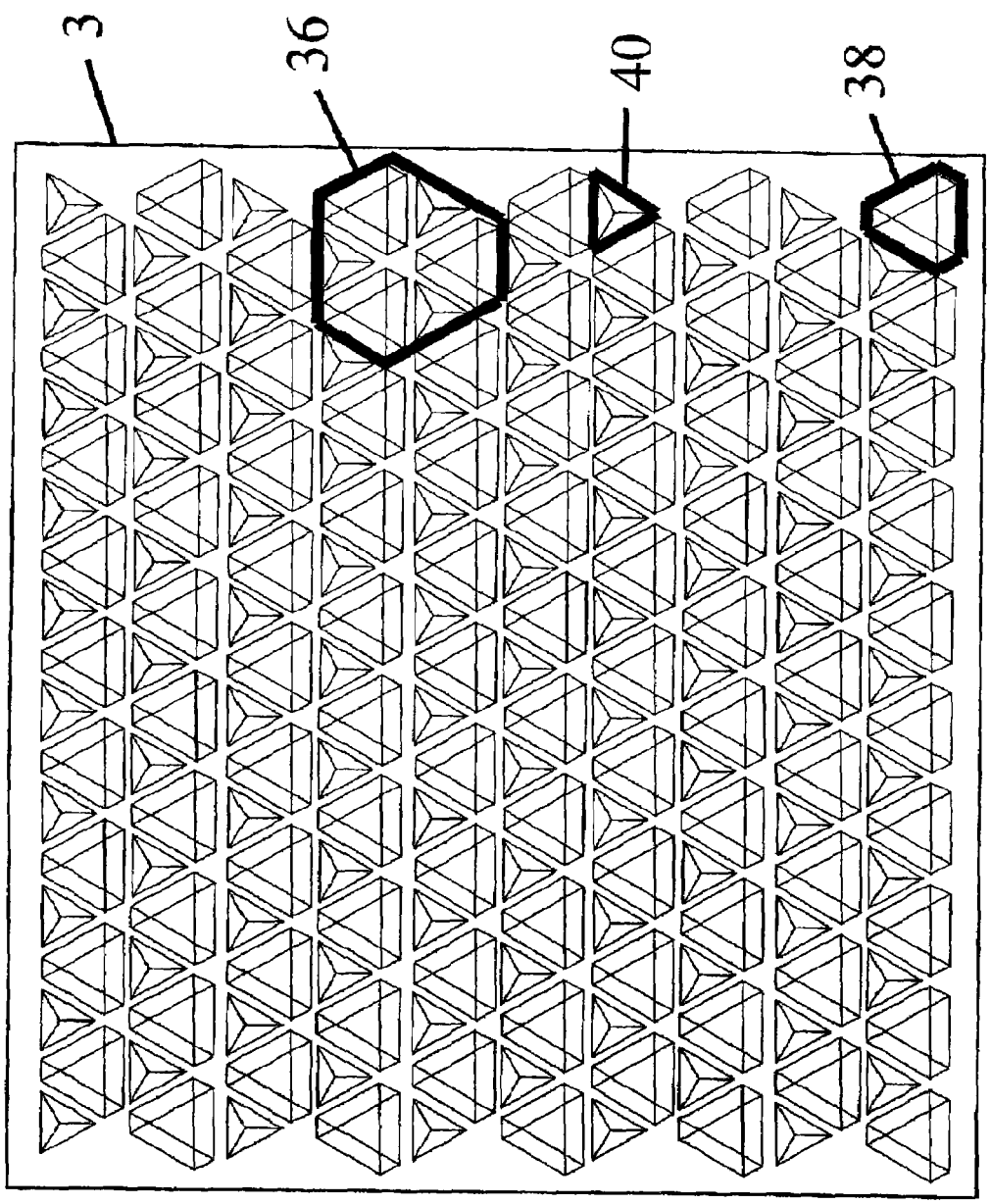
FIG. 4 is a top plan view of an optical component consisting of multiples of the optical component illustrated in FIG. 3.

This figure is a plan view showing the resultant pattern created by repeating the grooves (as in FIG. 3.) over a larger expanse of optical material (3). Similar repeating patterns can be constructed by intersecting two or more orthogonal grooves, but for simplicity of presentation, the pattern created by intersecting three grooves is used for illustrative purposes only, and does not limit the scope of the present claims. It can be seen that the basic unit (36) repeats across the surface of the optical component. These basic units (as seen in FIG. 3.) are comprised of flat surfaces perpendicular to the incident stimulus, and triangles (38,40) with facets cut a Brewster's Angle. We have named such a device a "Brewster's Grism".

FIG. 5.

This figure illustrated the basic construction of a polarization-sensing camera utilizing optical components, a "Brewster's Grism", and a CCD imaging chip. In-coming light (containing various degrees and orientations of polarization) passes though an imaging lens (42), reducing the size of the image and passing the light through a collimating lens (44). The stimulus, now consisting of parallel rays of light (10), having an orientation identical to the surface normal of the flat surfaces of the Brewster's Grism (3), strikes the angled facets at Brewster's Angle. The transmitted light then strikes the active surface of the CCD, creating an unique spatial pattern of input intensities, which is dependent on the spatial distribution polarization intensity and orientation within the input image.

FIG. 6.

This figure illustrates the unique spatial intensity pattern which would fall on the underlying CCD detector when this section of the Brewster's Grism is illuminated by a stimulus that is completely polarized, and having an radial orientation (Plane of Polarization) as shown. All facets cut at Brewster's Angle, and having a radial orientation that is parallel to the plane of polarization (5a), would completely reflect the polarized stimulus (facets shown as black). As a result, the pixels of the underlying CCD sensor would receive little input. In this example, all other facets cut at Brewster's Angle (5b, 5c) differ from the radial orientation of the stimulus polarization by identical amounts, and thus only pass a portion of the polarized stimulus (facets shown in grey). All flat surfaces (4a,4b,4c) with surface normals matching the angle of the incident stimulus equally pass all angles of stimulus polarization (facets shown in white). By comparing the intensity of the stimulus transmitted through spatially adjacent angled (5) and flat (4) facets, the precise percentage, orientation, and spatial distribution of polarization within the input image can be calculated.

FIG. 7.

This figure illustrates the unique spatial intensity pattern which would fall on the underlying CCD detector when this section of the Brewster's Grism is illuminated by a stimulus that is completely polarized, and having an radial orientation (Plane of Polarization) as shown. All facets cut at Brewster's Angle, and having a radial orientation that is parallel to the plane of polarization (5c), would completely reflect the polarized stimulus (facets shown as black). As a result, the pixels of the underlying CCD sensor would receive little input. In this example, all other facets cut at Brewster's Angle (5a, 5b) differ from the radial orientation of the stimulus polarization by identical amounts, and thus only pass a portion of the polarized stimulus (facets shown in grey). All flat surfaces (4a,4b,4c) with surface normals matching the angle of the incident stimulus equally pass all angles of stimulus polarization (facets shown in white).

FIG. 8.

This figure illustrates the unique spatial intensity pattern which would fall on the underlying CCD detector when this section of the Brewster's Grism is illuminated by a stimulus that is completely polarized, and having an radial orientation (Plane of Polarization) as shown. All facets cut at Brewster's Angle, and having a radial orientation that is parallel to the plane of polarization (5b), would completely reflect the polarized stimulus (facets shown as black). As a result, the pixels of the underlying CCD sensor would receive little input. In this example, all other facets cut at Brewster's Angle (5a, 5c)

differ from the radial orientation of the stimulus polarization by identical amounts, and thus only pass a portion of the polarized stimulus (facets shown in grey). All flat surfaces (4a,4b,4c) with surface normals matching the angle of the incident stimulus equally pass all angles of stimulus polarization (facets shown in white).

FIG. 9.

This figure illustrates the unique spatial intensity pattern which would fall on the underlying CCD detector when this section of the Brewster's Grism is illuminated by a stimulus that is completely polarized, and having an radial orientation (Plane of Polarization) as shown. In this case, none of the facets have a radial orientation that is parallel to the plane of polarization, and therefore each facet transmits the polarized stimulus to a certain extent. Facets 5b and 5c (and all facet parallel to their surfaces) transmit the polarized stimulus equally (facets shown as grey). All facets with a radial orientation ninety degree to the plane of polarization (shown in white) would effectively transmit the stimulus with an efficiency approaching that of the flat surfaces (4a,4b,4c).

FIG. 10.

This and subsequent figures illustrate that the basic principles of operation as defined for the "Brewster's Grism" can be equally applied to an imaging system constructed of a bundle of optical fibers. Shown is a section of optical fiber (2), which terminates in facet (4) cut so that a line drawn parallel to its face (6) is at an angle of ninety degrees (8) relative to the incident illumination (10). The stimulus (10) is comprised of various degrees and orientations of polarization, of which only the vertical (14) and horizontal (12) components are shown for simplicity of presentation. The stimulus is transmitted through the optical fiber (16), and is emitted (18) containing its full compliment of polarization orientations (only the vertical 22, and horizontal 20 components are shown). It is important to note that, if a polarization preserving optical fiber is not used, internal reflections in standard optical fibers (as shown) effectively randomize the polarization content during propagation through the fiber.

FIG. 11.

As in FIG. 1., a section of optical fiber is illustrated (2), which terminates in a facet (5) cut so that a line drawn parallel to its face (7) is at an angle (9) (relative to the incident stimulus, (10)) that equals the Arc Tangent of the material's refractive index for the stimuli's wavelength. Such an angle is known as Brewster's Angle, and it has the effect of completely reflecting polarized light (19) with an orientation (20) that is parallel to the surface's face (5). Other orientations of polarization, such as vertical (14) are transmitted through the optical fiber (17), and are emitted (18). While the vertically polarized component (22) contributes the most to the intensity of the transmitted stimulus, its polarization orientation is subsequently randomized by internal reflections during propagation through the fiber.

FIG. 12.

This figure illustrates a section of optical fiber (2), terminating in facet (4), cut so that a line drawn parallel to its face (6) is at an angle (8) of ninety degrees relative to the incident polarized illumination (10). In this case, the incident illumination (10) has an initial polarization orientation (12), and the stimulus polarization orientation is rotated until it 90 degrees to its initial orientation (14). Since all orientations of polarization are equally propagated (16) through this fiber, the intensity of the emitted stimulus (18) is the same for both initial and final polarization orientations.

FIG. 13.

This graph represents the relationship between the percentage of the incident stimulus propagated and emitted (18) from the fiber (shown in FIG. 12), as the polarization orientation is revolved from the initial orientation (12) to the second orthogonal orientation (14). Since all orientations of stimulus polarization are equally transmitted, there are no differences in the percentage of stimulus transmitted as the angle of stimulus polarization is varied.

FIG. 14.

This figure illustrates a section of optical fiber (2), terminating in a facet (5), cut so that a line drawn parallel to its face (7) is at Brewster's Angle (9) relative to the incident illumination (10). In this case, the incident illumination (10) has an initial polarization orientation (12), which is rotated until it is at an orientation that is 90 degrees to its initial orientation (14). Due to the property of Brewster's Angle (9), the proportion of the stimulus that is transmitted (17) through and emitted (18) from the optical fiber, is inversely proportional to the amount reflected (19) off the facet (5).

FIG. 15.

This graph represents the relationship between the percentage of the incident stimulus propagated and emitted from a fiber (18, FIG. 14.), as the polarization orientation is revolved from the initial orientation (12) to the second orthogonal orientation (14). Since the initial plane of polarization strikes the fiber parallel to the face (and at Brewster's Angle), the majority of the stimulus is reflected off the facet with little or none transmitted through the fiber (12). As the polarization orientation is progressively rotated ninety degrees from the original orientation, the proportion of transmitted stimulus increases to a maximum amount (14).

FIG. 16.

This graph represents the relationship between the percentage of the incident stimulus reflected off the face of a fiber by Brewster's Angle (19, FIG. 14.), as the polarization orientation is revolved from the initial orientation (12) to the second orthogonal orientation (14). Since the initial plane of polarization strikes the fiber facet parallel to the face (and at Brewster's Angle), the majority of the stimulus is reflected off the facet (12). As the polarization orientation is progressively rotated ninety degrees from the original orientation, the proportion of the stimulus transmitted increases to a maximum amount (14).

FIG. 17.

Illustrated is a fiber optic bundle comprised of a cluster of individual optical fibers (2) with input facets cut at either Brewster's Angle (5) or orthogonal to the incident stimulus (4). The percentage of stimulus polarization and precise polarization orientation at any spatial location can be accurately calculated by comparing the amount of light propagated through adjacent "Brewster Fibers" of differing axial orientation (5) and adjacent "Reference Fibers" (4).

FIG. 18.

This figure illustrates the arrangement of optical components that results in the creation of a "Brewster Bundle". A "Brewster Bundle" is an imaging fiber optic bundle, with the input end of the fibers cut with facets either at ninety degrees relative to the incident stimulus (as 4 in FIG. 18.), or at Brewster's Angle and arranged at various degrees of axial rotation (as 5 in FIG. 18.). In-coming light is first passed through an imaging lens (42), to reduce the size of the stimulus image, and focuses the stimulus onto a collimating lens (44). After passing through the collimating lens (44), the light within the stimulus beam is parallel, and strikes the facets on the end of the optical fibers (4 & 5) either at Brewster's Angle or at an angle orthogonal to the fiber's facet (for reference fibers). The bundle of individual fibers (2) then propagates the stimulus to their terminal ends where the stimulus is emitted (18), and passes through imaging optics (48) to focus the stimulus onto a CCD imaging chip (or sensor appropriate for the wavelength of the stimulus).

FIG. 19.

Figure 19:
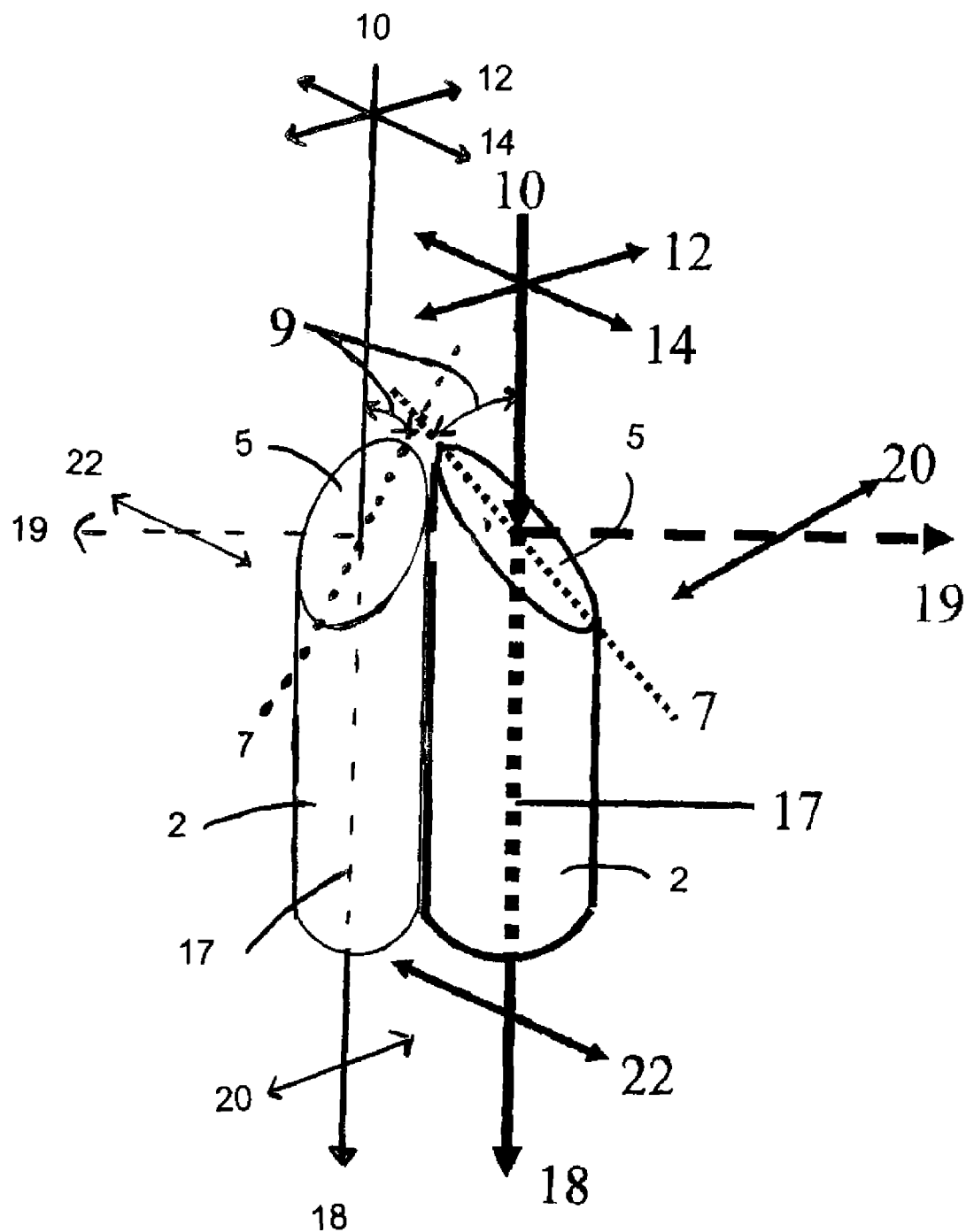
FIG. 19 is a perspective view of an optical component consisting of two optical fibers each with an end face cut a Brewster's Angle.

FIG. 19 depicts an arrangement with two optical fibers 2, 2, one reflecting a first component 12 and the other reflecting a second component 14.

Brewster's Grisms can be constructed of a variety of material specifically chosen to match the wavelength properties of the polarized stimulus. For example, Brewster's Grisms transmissive in the optical range of stimuli could be made of glass, fused silica, quartz, or optical plastics. Brewster's Grisms designed to function in the microwave or radar range of stimuli could be made from microwave lensing material such as Rexolite plastic. Reflective Brewster's Grisms can also be constructed whereby the intensity of reflected stimuli off of individual facets is used to determine the orientation and percentage of polarization of spatially discrete stimuli (for example, see FIG. 16.).

The Brewster's Grism is placed behind a collimating lens (or mechanism appropriate for the physical properties of the polarized stimulus) in the stimulus path, directly in front of a sensing array appropriate for the range of stimuli being detected. For example, for optical measurements the Brewster's Grism could be placed directly above the active area of a CCD imaging chip (see FIG. 2. and FIG. 5.). For measurements of microwave polarization, the Grism could be integrated with, or placed directly on an array of appropriately tuned micro-antennas.

In contrast to existing polarization filters, (which can sample only one plane of polarization at a time), the Brewster's Grism's physical structure allows for simultaneous real-time sensing of multiple polarization planes. In addition, by comparing the transmission intensities at multiple adjacent facets (and areas of the Grism that are transmissive to all planes of polarization), the precise angle of intermediate planes of polarization and percentage of stimulus polarization can be directly calculated. Also, while traditional polarization filters are spatially homogeneous (all areas of the filter are "tuned" to the same plane of polarization), the Brewster's Grism's structure allows for the real-time determination of spatial variations within the polarization dimension of the stimulus. In the presence of intervening scattering medium or mechanisms, Polarization Difference Imaging (PDI) can be applied to these polarization maps to greatly enhance target detection and signal to noise ratios.

Brewster's Bundle

The Brewster's Bundle is a fiber optic bundle comprised of normal optical fibers, mixed with fibers with one end cut at Brewster's angle. All cut fibers are at the stimulus input end of the fiber bundle, behind a collimating lens. The bundle is constructed so that (1) the bundle is coherent (and therefore acts as an image guide), and (2) has the Brewster angle cut fibers equally distributed through out the bundle with random or predetermined axial orientations (see FIG. 17.).

As with the Brewster's Grism, fibers with ends not cut at Brewster's angle transmit light of all polarization angles equally effectively, thereby creating a standard, spatially discrete illumination intensity reference. The ratio of transmission through reference and adjacent fibers cut at Brewster's angle, (having either randomly or predetermined varying radial orientations), allows for the calculation of a spatially discrete estimate of both (1) the angle of stimulus polarization, and (2) the percentage of polarization within the stimulus.

Our research has clearly demonstrated that both stimulus detection and PDI image formation of an object in the presence of scattering medium or mechanisms can be greatly enhanced when the object is illuminated by a polarized (linear, circular or elliptical) stimulus source, which maximizes the percentage of target-reflected polarized stimuli. In cases where use of the Brewster Bundle requires a polarized illumination system constrained within the space of the physical dimensions of the Brewster's Bundle, a set of polarization preserving (uni-modal) optical fibers can be evenly distributed within the Brewster's Bundle. All polarization preserving fibers can (1) have the same radial orientation (therefore all fibers emit the same plane of polarization), or (2) multiple independent polarization preserving fiber bundles with different random or predetermined planes of polarization can be integrated into the Brewster's Bundle. As a result, the combined bundles can selectively illuminate the target with a variety of specific polarizations, and the reflected light from the target can be projected on to the input end of the Brewster's Bundle (having the cut faces at varying radial orientations).

LASER diodes of various intensities and wavelengths can be chosen to best suit the application of the bundle, and the Brewster's Bundle can be constructed to suit differing spatial requirements. For example, Brewster's Bundles can be constructed as Orthoscopes or Boroscopes, thereby allowing for the application of Polarization Difference Imaging during surgery. PDI would enhance vision in scattering medium, enhance tissue contrast, and potentially differentiate between healthy and cancerous tissue (see S. G. Demos, et. Al., 2000). In contrast, larger scale Brewster's Bundles (1-2 cm dia.) can be constructed for various imaging and polemetry requirements.

Figure 5:
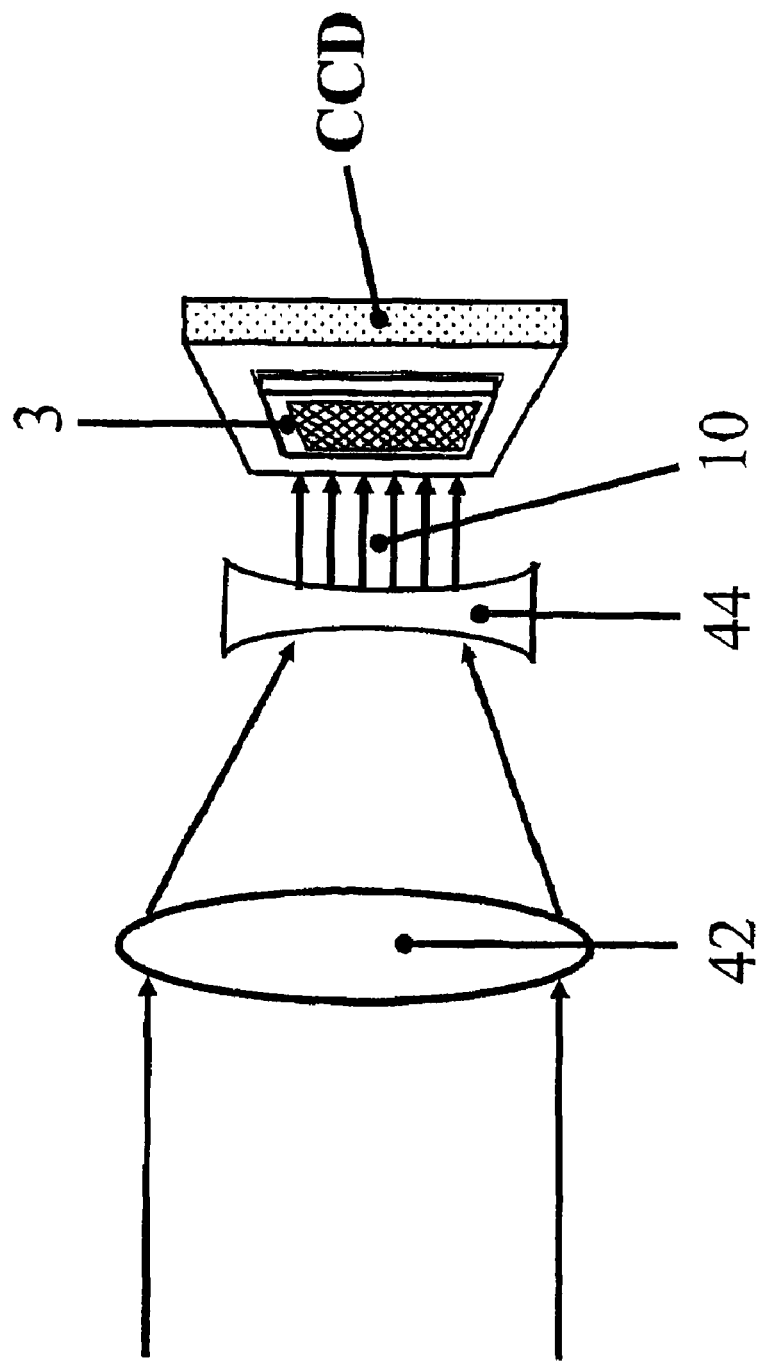
FIG. 5 is a side elevation view of an imaging device using the optical component illustrated in FIG. 4.
Figure 6:
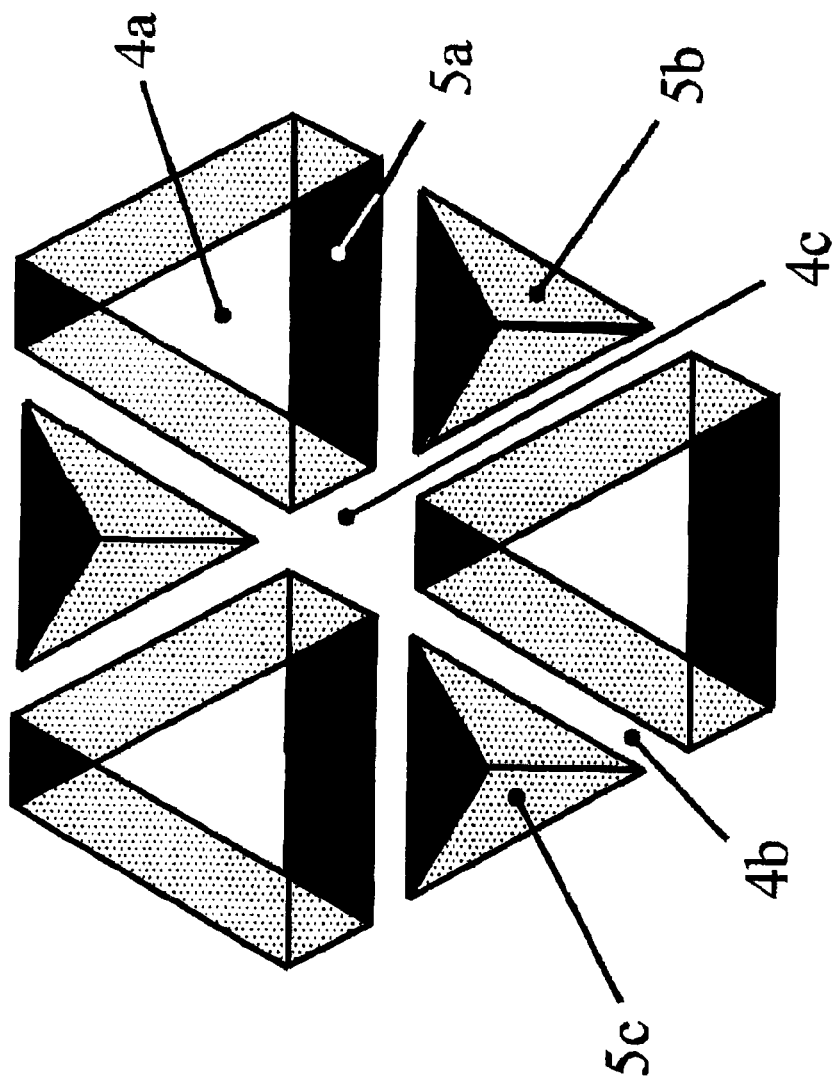
FIG. 6 through FIG. 9 are top plan views of the optical component illustrated in FIG. 3, showing differing plane of polarization patterns.
Figure 7:
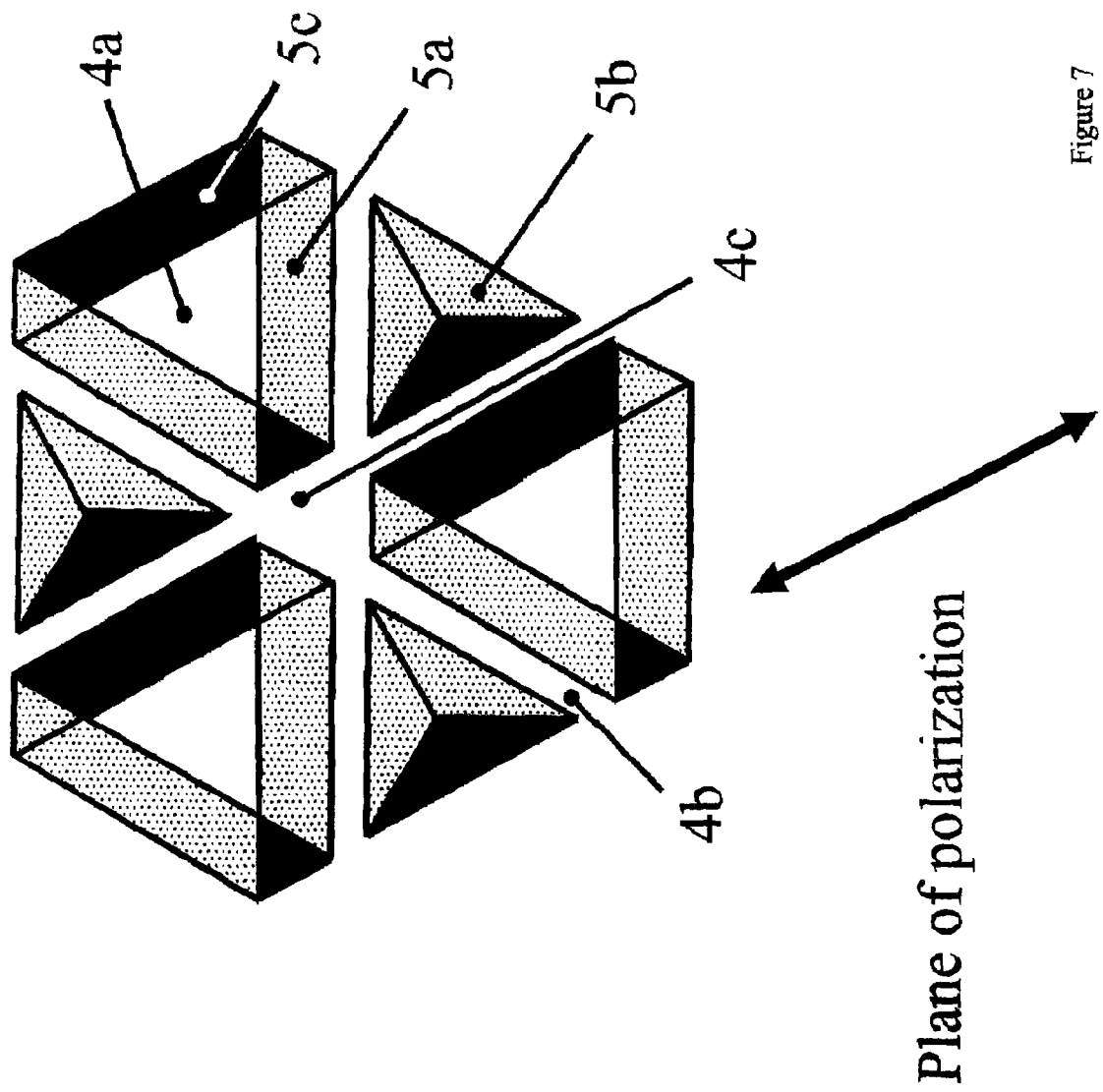
Figure 8:
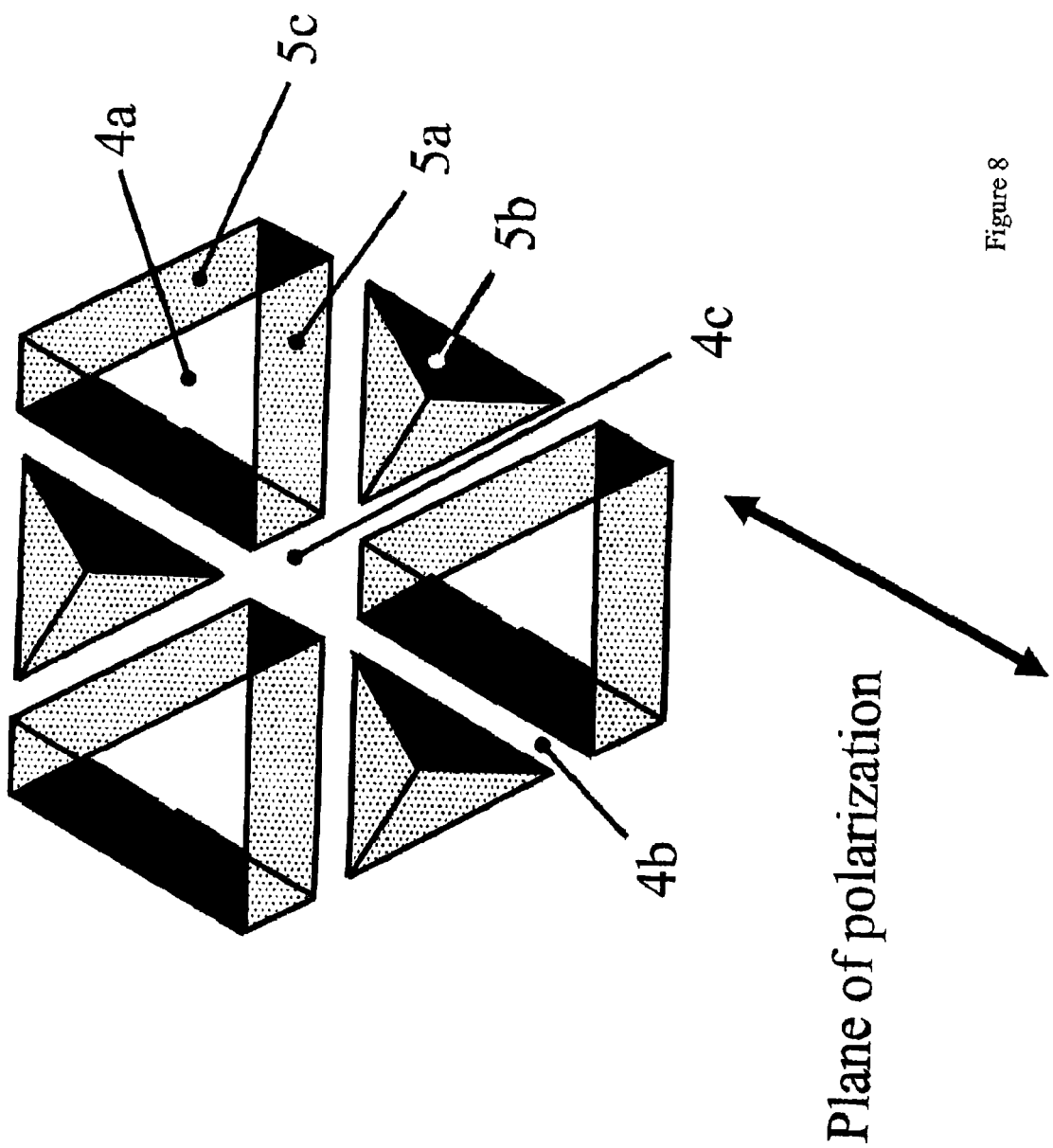
Figure 9:
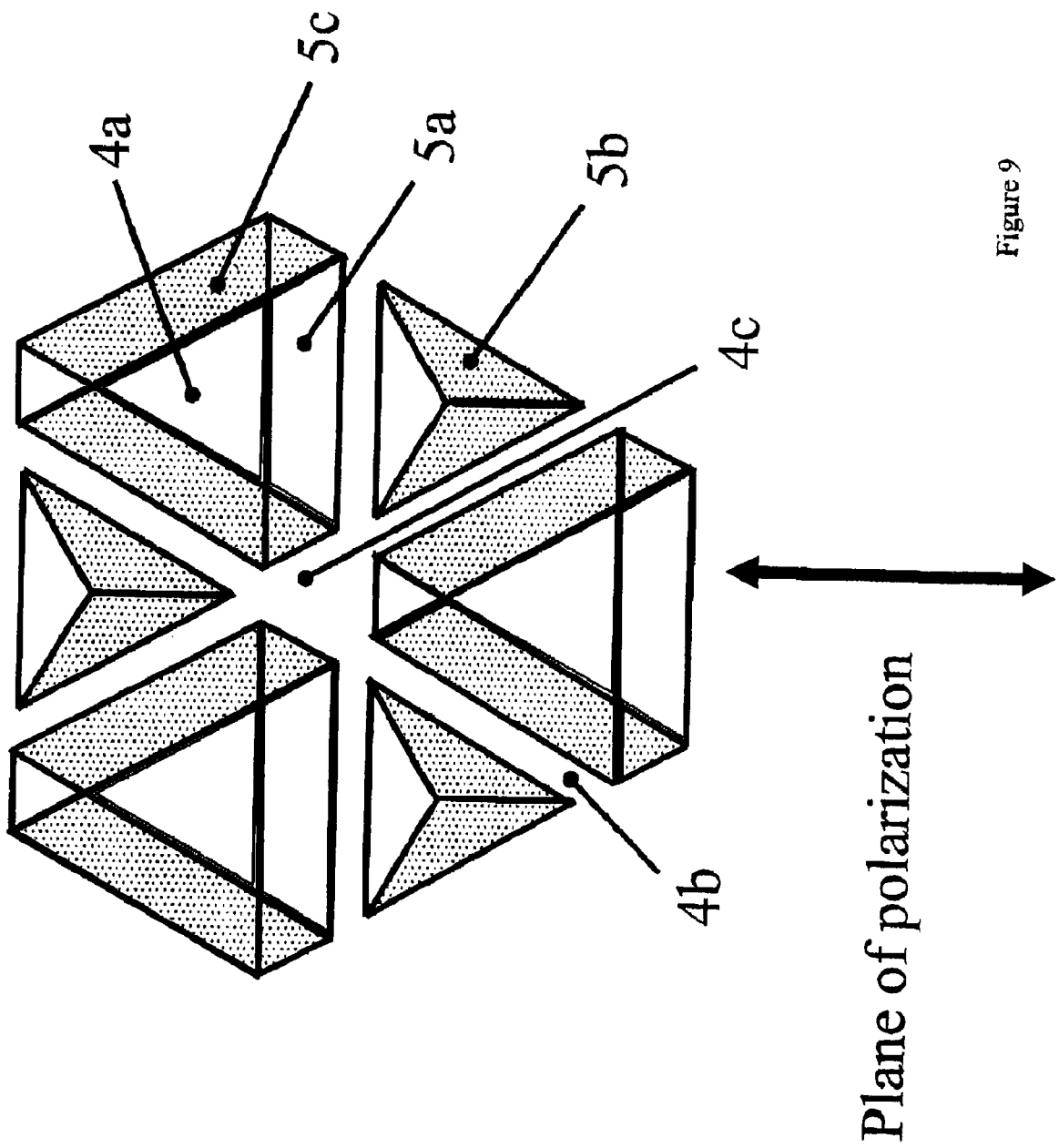
Figure 10:
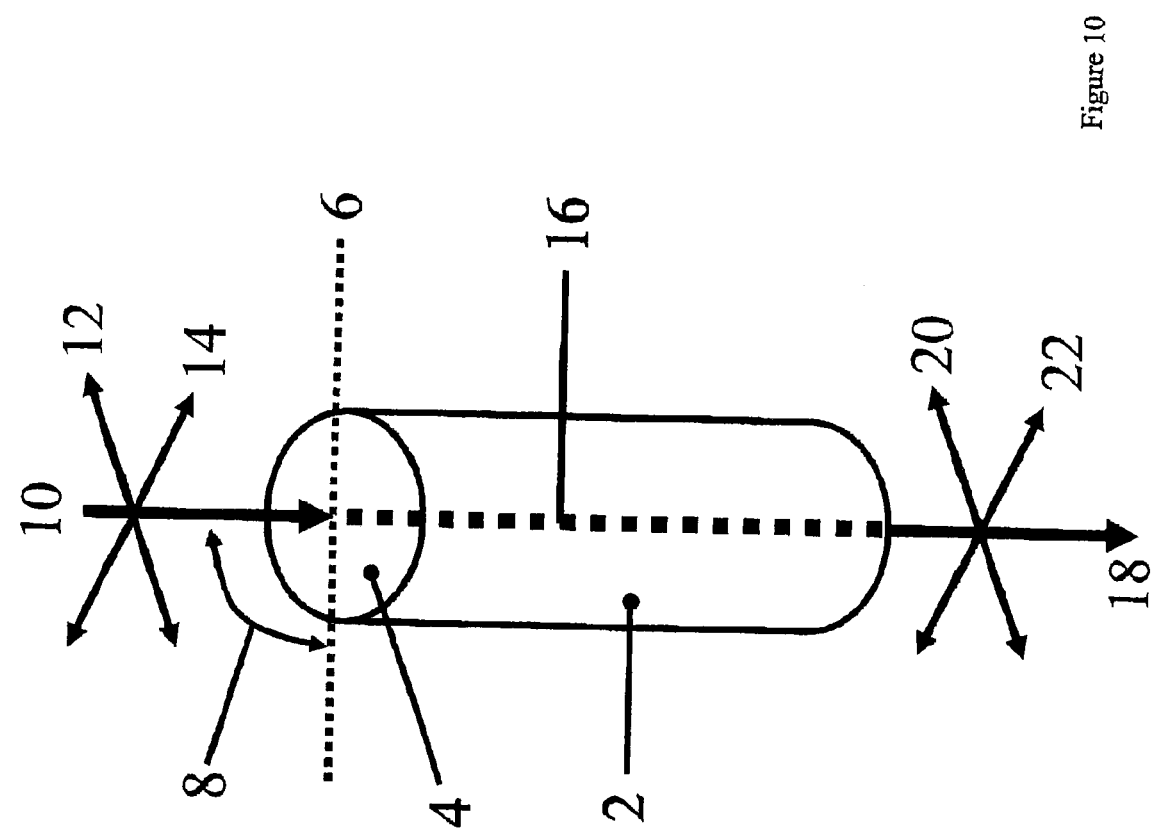
FIG. 10 is a perspective view of an optical component consisting of a single optical fiber.
Figure 11:
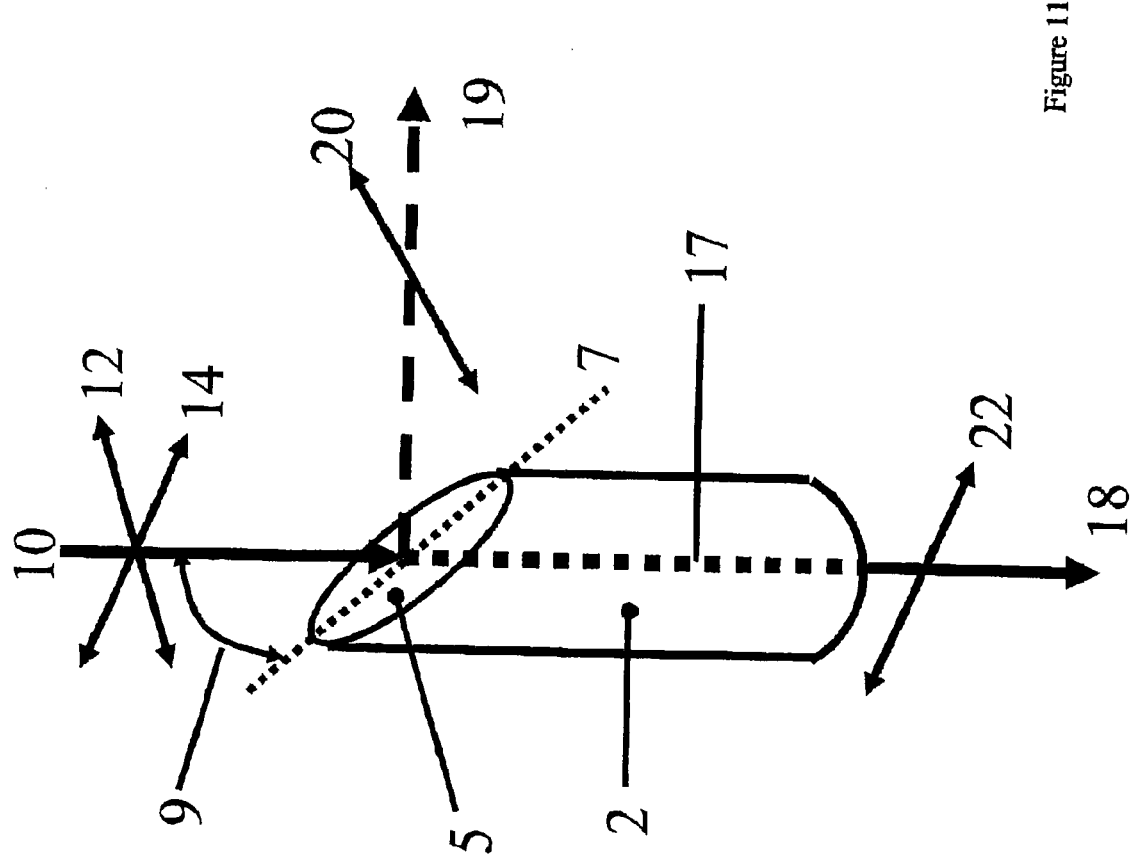
FIG. 11 is a perspective view of an optical component consisting of a single optical fiber with an end face cut a brewsters angle.
Figure 12:
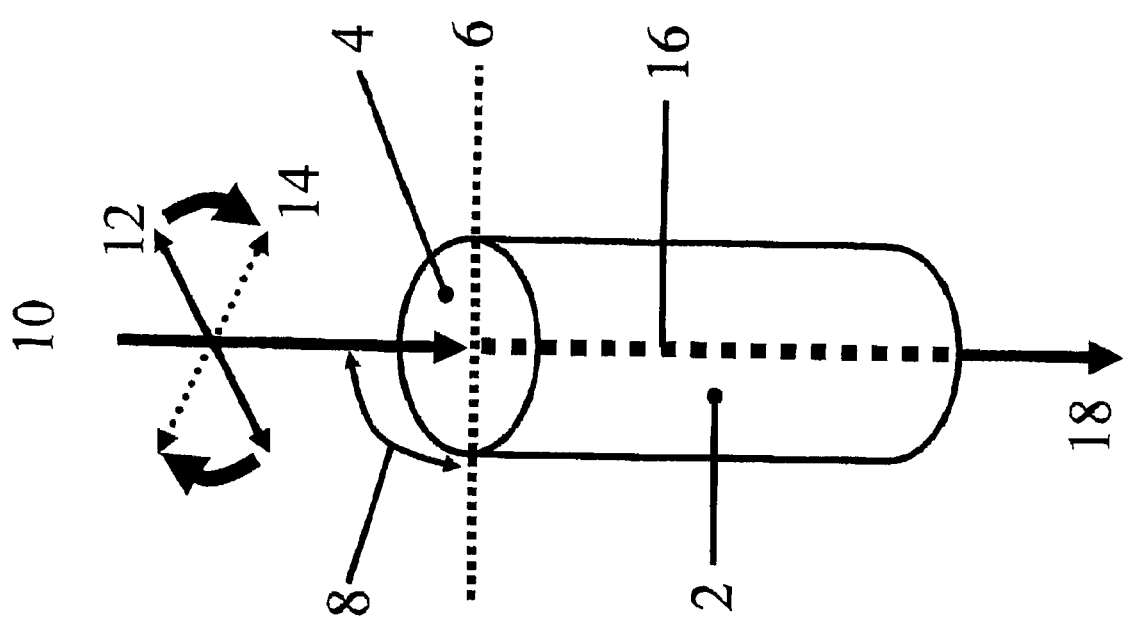
FIG. 12 is a perspective view of an optical component consisting a single optical fiber.
Figure 13:
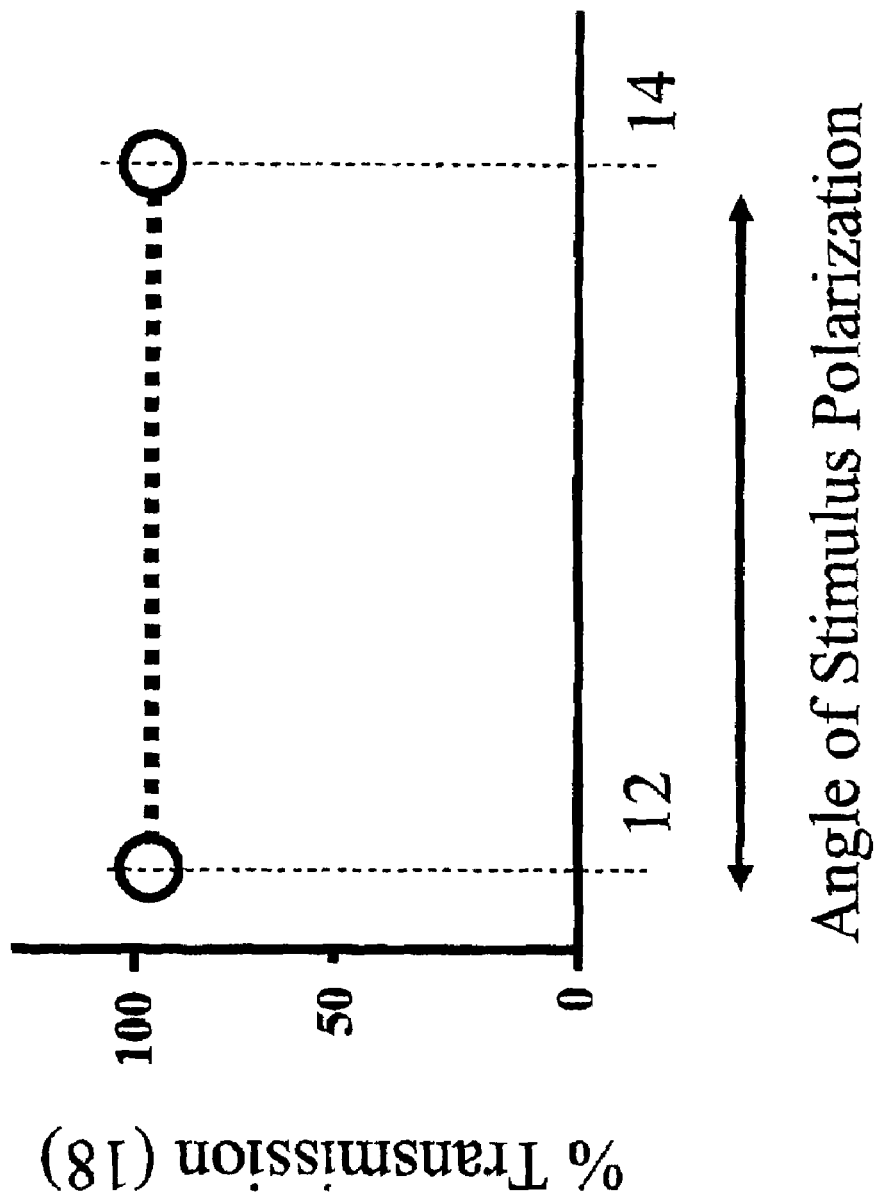
FIG. 13 is a graph of transmission percentages relative to angle of stimulus polarization for transmitted light with respect to the optical component illustrated in FIG. 12.
Figure 14:
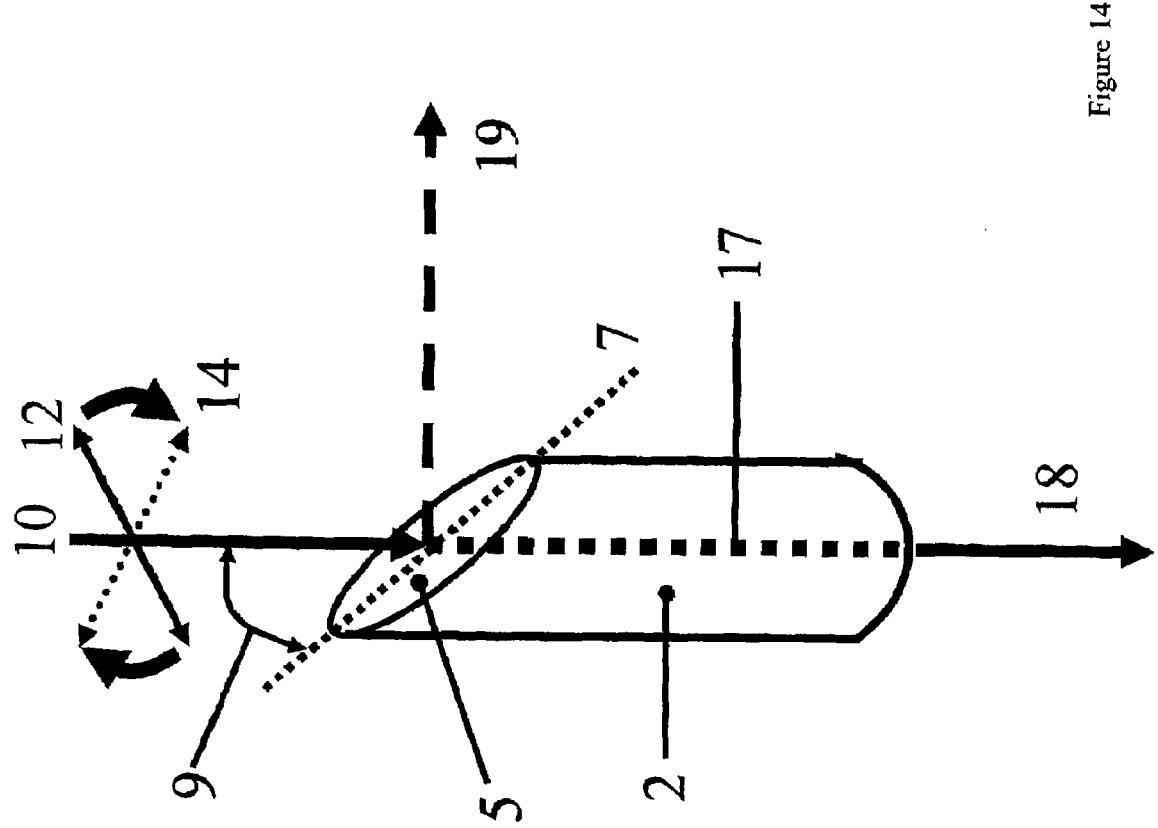
FIG. 14 is a perspective view of an optical component consisting of a single optical fiber cut at Brewster's angle.
Figure 15:
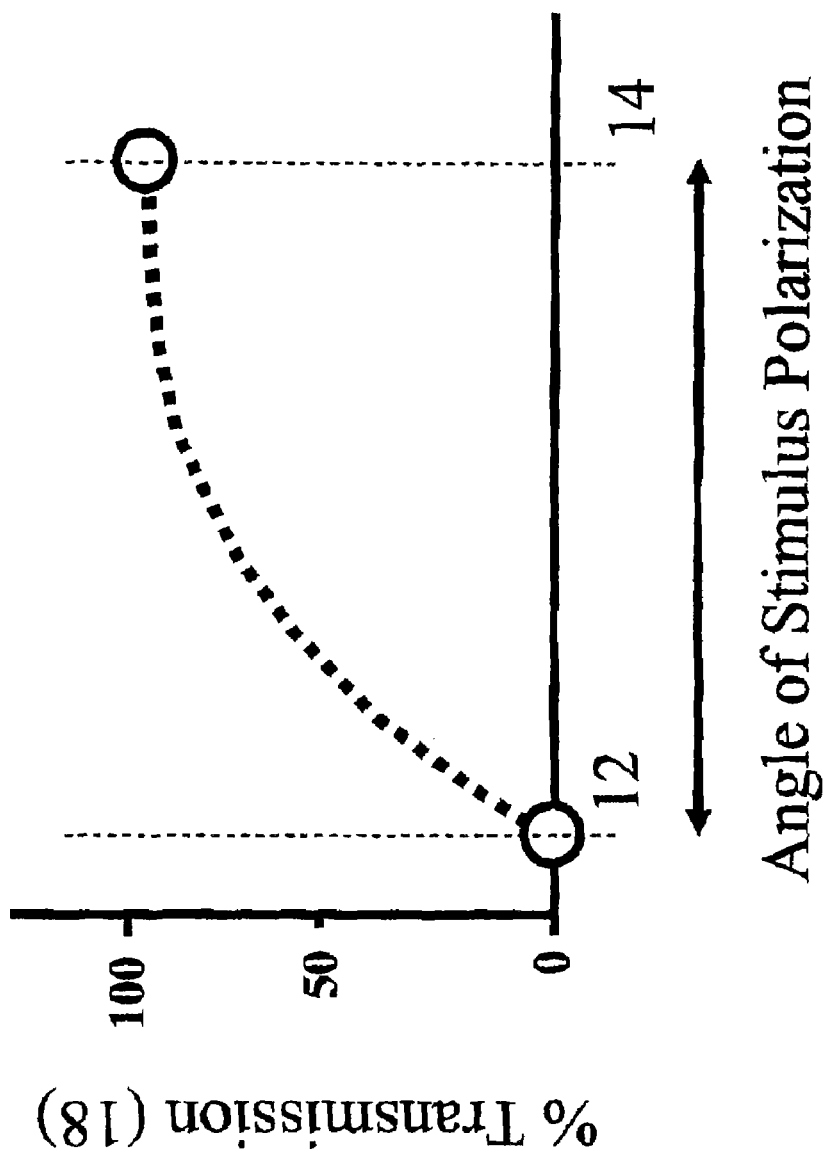
FIG. 15 is a graph of transmission percentages relative to angle of stimulus polarization for transmitted light with respect to the optical component illustrated in FIG. 14.
Figure 16:
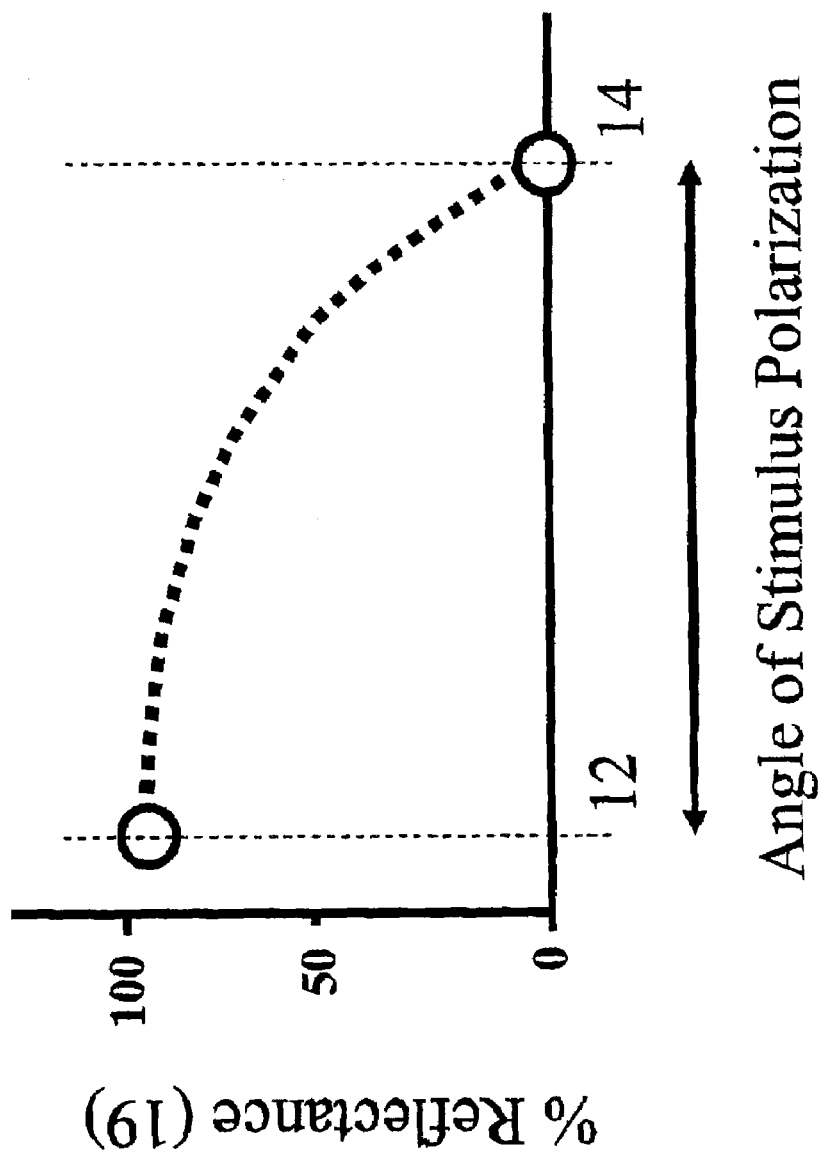
FIG. 16 is a graph of transmission percentages relative to angle of stimulus polarization for reflected light with respect to the optical component illustrated in FIG. 14.
Figure 17:
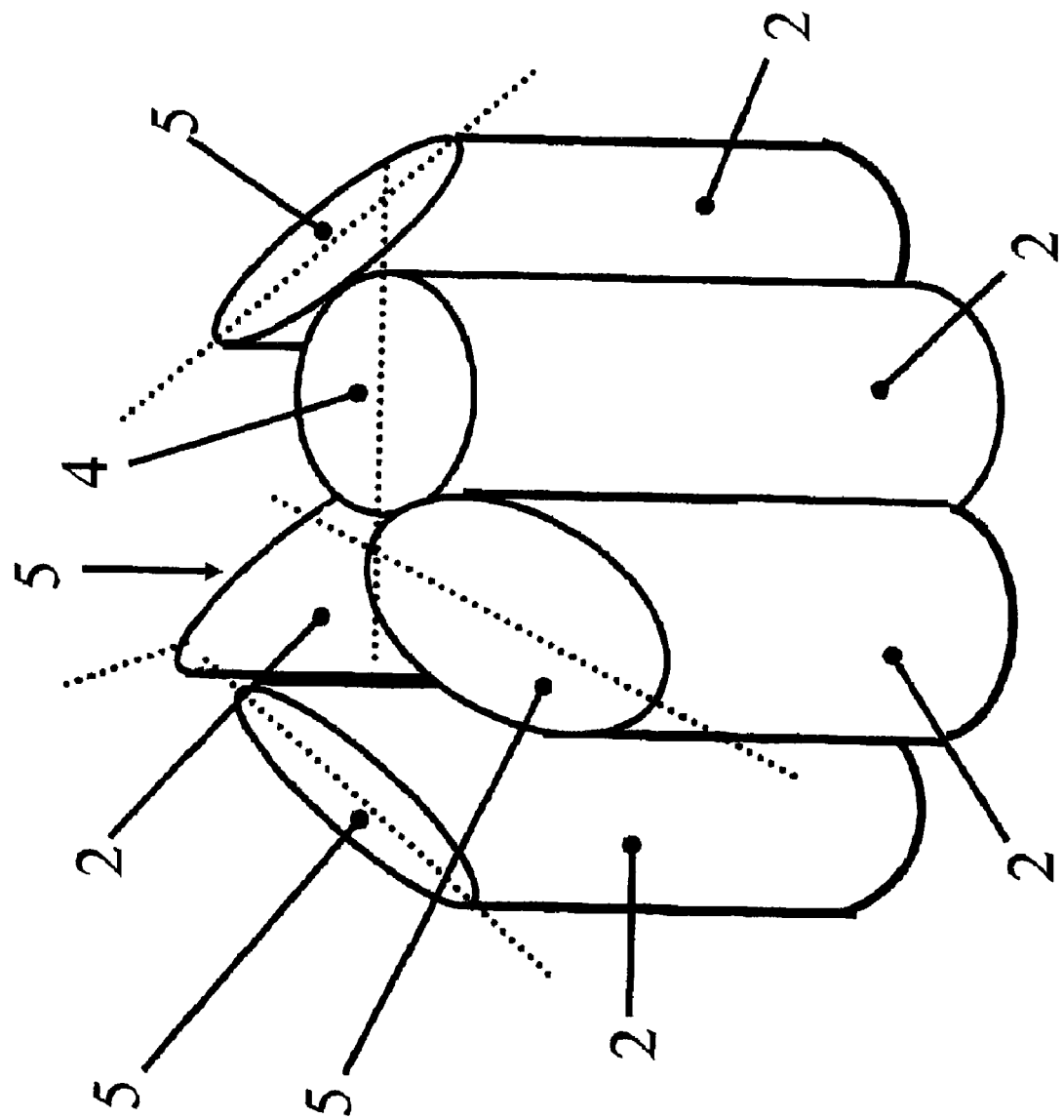
FIG. 17 is a perspective view of an optical component consisting of a bundle of optical fibers.

Structure and Relationship of Parts (Brewster's Grism):

The imaging lens system (FIG. 5., item 42.) focuses converging rays of light on to a Collimating lens (FIG. 5., item 44.). As a result, the stimulus incident on the Brewster Grism (FIG. 5., item 30.) strikes the facets of the Grism (FIG. 5., item 3.) all at the same angle of incidence (Brewster's Angle). In addition, the stimulus will also strike surfaces of the Grism that are perpendicular to incident stimulus (for example FIG. 2.), and thus transmit stimuli of all polarization orientations. Based on the spatial variations in the polarization orientations contained in the stimulus, and the radial orientation of the facets on the grism that they fall upon, a specific distribution of transmitted intensities will be created (see FIGS. 6. to 9.) which will fall upon the underlying sensor (as in FIG. 2.).

Figure 18:
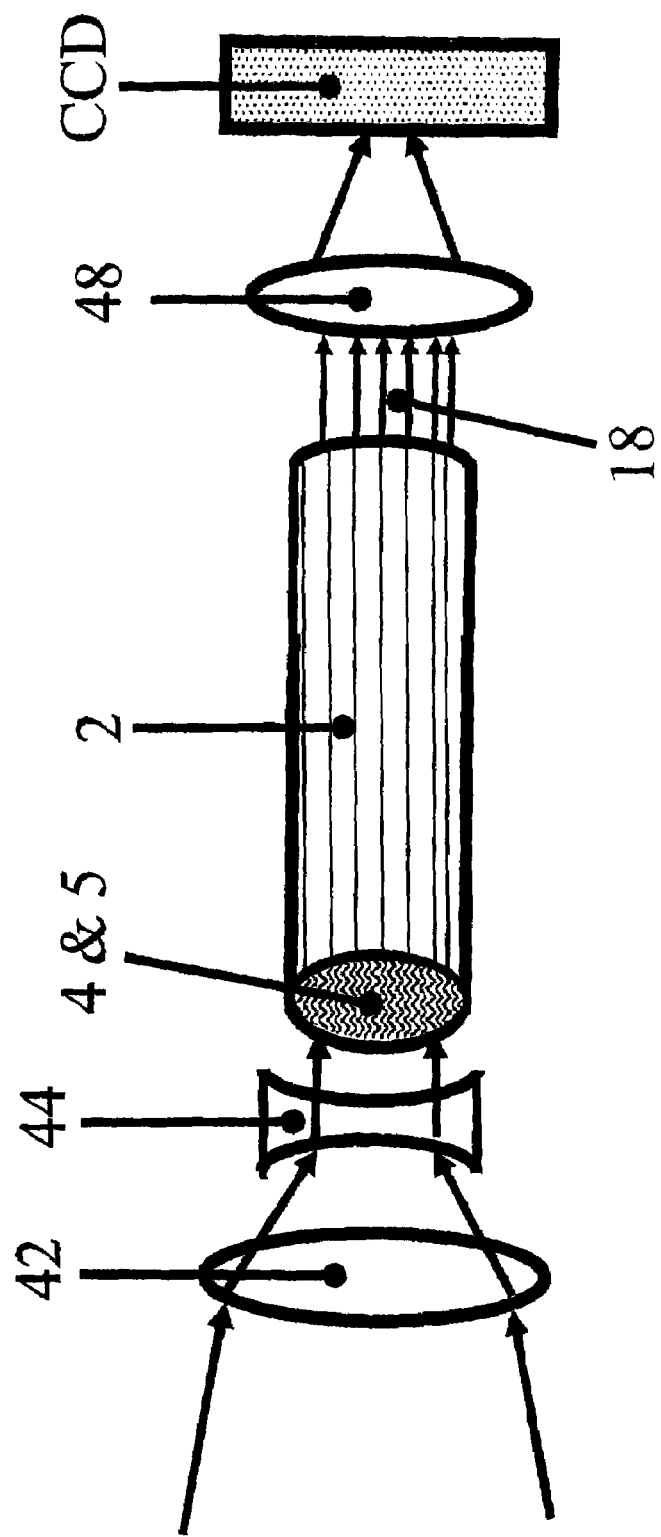
FIG. 18 is an imaging device using the optical component illustrated in FIG. 17.

Structure and Relationship of Parts (Brewster's Bundle):

The imaging lens system (FIG. 18., item 42.) focuses converging rays of light on to a Collimating lens (FIG. 18., item 44.). As a result, the stimulus incident on the receptive end of the Brewster Bundle (FIG. 18., items 4. and 5.) strikes the cut facets of the individual fibers (as in FIG. 17., items 4. and 5.) all at the same angle of incidence (Brewster's Angle) (see FIG. 11.). The stimulus will also strike a number of fibers, which have faces cut perpendicular to the incident stimulus, and thus transmit stimuli of all polarization orientations equally (see FIG. 10.). The radial orientation of the individual fibers may be random or predetermined, dependent on the specialized application of the system. Based on the spatial variations in the polarization orientations contained in the stimulus, and the radial orientation of the facets on the cut end of the fibers that they fall upon, a specific distribution of transmitted intensities will be created within the bundle which will be transmitted to the other end of the optical fiber bundle (FIG. 18., item 18.). At the end of the bundle, an image-forming lens (FIG. 18., item 48.) will focus the transmitted light upon the underlying sensor (FIG. 18., CCD).

It can be seen from the descriptions above, that such polarization filters can be used to, (1) enhance stimulus detection or image formation of an object in the presence of scattering medium or mechanisms, when the object is passively illuminated by a non-polarized stimuli (in which case the surface features of the target object imparts a partial polarization to the returned signal), (2) enhance stimulus detection or image formation of an object in the presence of scattering medium or mechanisms when the object is illuminated by a polarized (linear, circular or elliptical) stimulus source, and (3) to enhance detection and reduce signal degradation of polarized stimuli utilized to transmit data in the presence of, or through a scattering medium or mechanisms (such as with Free Space Optical systems).

The underlying principles of the Brewster's Grism do not restrict its mode of operation to either transmission or reflection. As such, by merely changing the position of the receptive array (CCD, antenna, light guides etc.) one could produce Brewster's Grisms that would function in either of these modes of stimulus reception.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A polarization filter utilizing Brewster's angle comprising:
    a light receiving body having an input end with a plurality of planar facets, at least two of the plurality of planar facets being arranged at Brewster's angle relative to an optical axis along which light from an incident stimulus of collimated electro-magnetic radiation projected concurrently from a single direction onto the input end passes after striking the plurality of planar facets of the body, the plurality of planar facets are positioned in different radial orientations, relative to the optical axis, to provide simultaneous differential transmission or simultaneous differential reflection of different polarization planes in the light projected from the incident stimulus, and the different polarization planes, which are transmitted through or reflected by the plurality of planar facets are each oriented in different radial orientations relative to the optical axis,
    wherein the body consists of a bundle of prisms, with one of the facets at an end of each prism, at least one of the facets of one of the prisms in the bundle of prisms being oriented to reflect a first polarized component (12) in the incident stimulus with a remainder of unreflected incident stimulus being simultaneously transmitted and at least one of the facets of another of the prisms in the bundle of prisms being oriented to simultaneously reflect a second polarized component (14), other than the first polarized component, in the incident stimulus with a remainder of unreflected incident stimulus being simultaneously transmitted.

2. The polarization filter as defined in claim 1, wherein the body is a unitary body with the facets integrally formed on the body.

3. The polarization filter as defined in claim 1, wherein at least one of the facets is polarization insensitive and positioned perpendicular to the optical axis to provide a comparative reference.

4. The polarization filter as defined in claim 1, wherein the first component is a substantially horizontal component in the incident stimulus and the second component is a substantially vertical component in the incident stimulus.

5. A polarization filter utilizing Brewster's angle comprising:
    a light receiving body having an input end with a plurality of planar facets,
    at least two of the plurality of planar facets being arranged at Brewster's angle relative to an optical axis along which light from an incident stimulus of collimated electro-magnetic radiation projected concurrently from a single direction onto the input end passes after striking the plurality of planar facets of the body,
    the plurality of planar facets being positioned in different radial orientations, relative to the optical axis, to provide simultaneous differential transmission or simultaneous differential reflection of different polarization planes in the light projected from the incident stimulus, and
    the different polarization planes, which are transmitted through or reflected by the plurality of planar facets, are each oriented in different radial orientations relative to the optical axis,
    wherein the body consists of a bundle of prisms, and each of the prisms is a transparent body with at least three facets at an end of each prism positioned in the light projected by the incident stimulus and angled toward each other in the direction of the incident stimulus at an acute angle.

6. The polarization filter as defined in claim 5, wherein at least one of the prisms in the bundle of prisms is truncated providing a facet that is polarization insensitive and positioned perpendicular to the optical axis to provide a comparative reference.

7. A polarization filter utilizing Brewster's angle comprising:
    a light receiving body having an input end with a plurality of planar facets, at least two of the plurality of planar facets being arranged at Brewster's angle relative to an optical axis along which light from an incident stimulus of collimated electro-magnetic radiation projected concurrently from a single direction onto the input end passes after striking the plurality of planar facets of the body, the plurality of planar facets are positioned in different radial orientations, relative to the optical axis, to provide simultaneous differential transmission or simultaneous differential reflection of different polarization planes in the light projected from the incident stimulus, and the different polarization planes, which are transmitted through or reflected by the plurality of planar facets are each oriented in different radial orientations relative to the optical axis,
    wherein the body consists of a bundle of prisms, with one of the facets at an end of each prism, at least one of the facets of one of the prisms in the bundle of prisms being oriented to reflect a first component (12) in the incident stimulus with a remainder of the incident stimulus being simultaneously transmitted and at least one of the facets of another of the prisms in the bundle of prisms being oriented to simultaneously reflect a second component (14) in the incident stimulus with a remainder of the incident stimulus being simultaneously transmitted.

8. The polarization filter as defined in claim 7, wherein the first component is a horizontal component and the second component is a vertical component.

* * * * *